July 5, 1927.  1,635,112
W. J. CARLSON ET AL
HOUSEHOLD STILL
Filed June 29, 1925   2 Sheets-Sheet 2
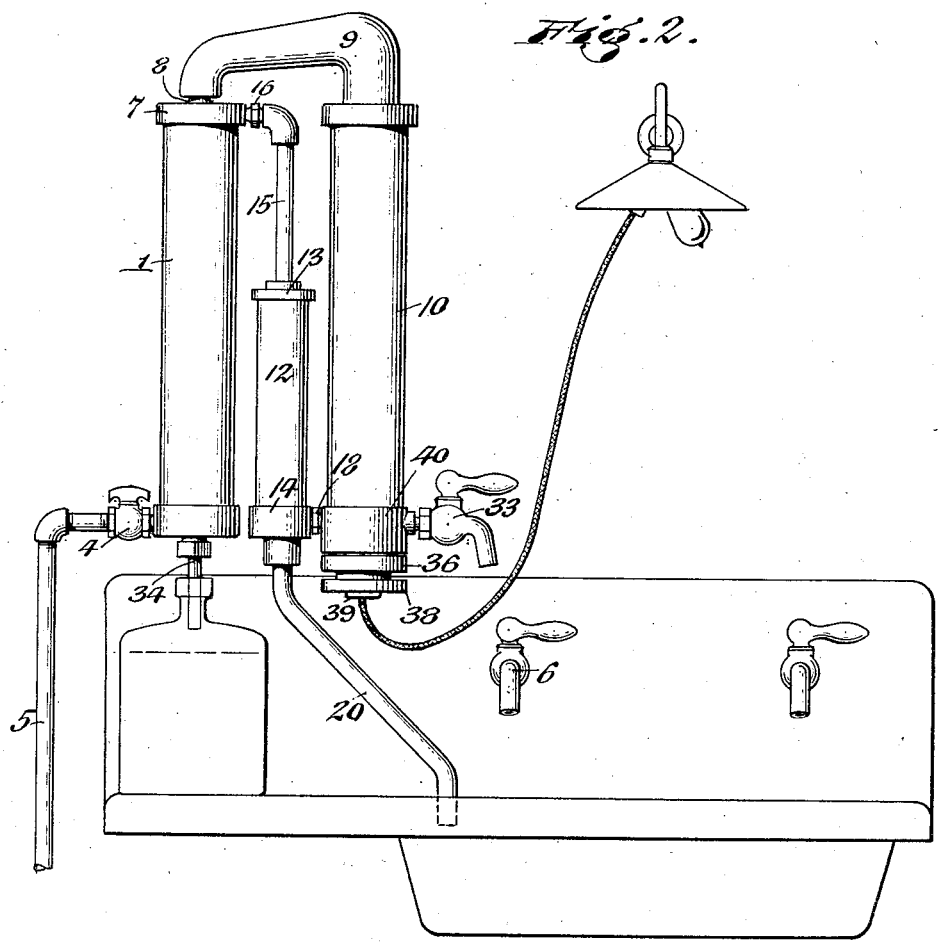
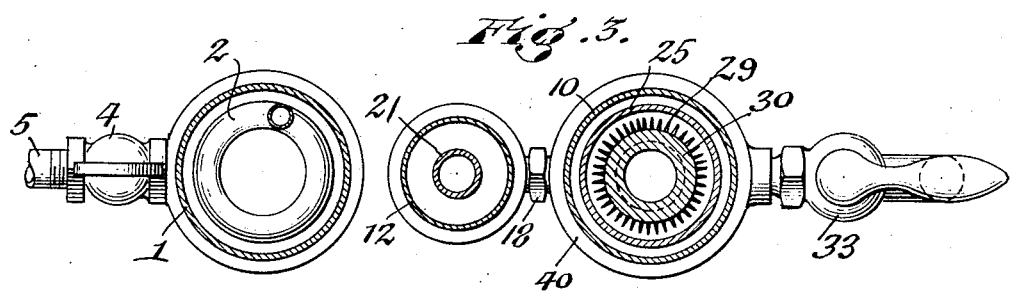

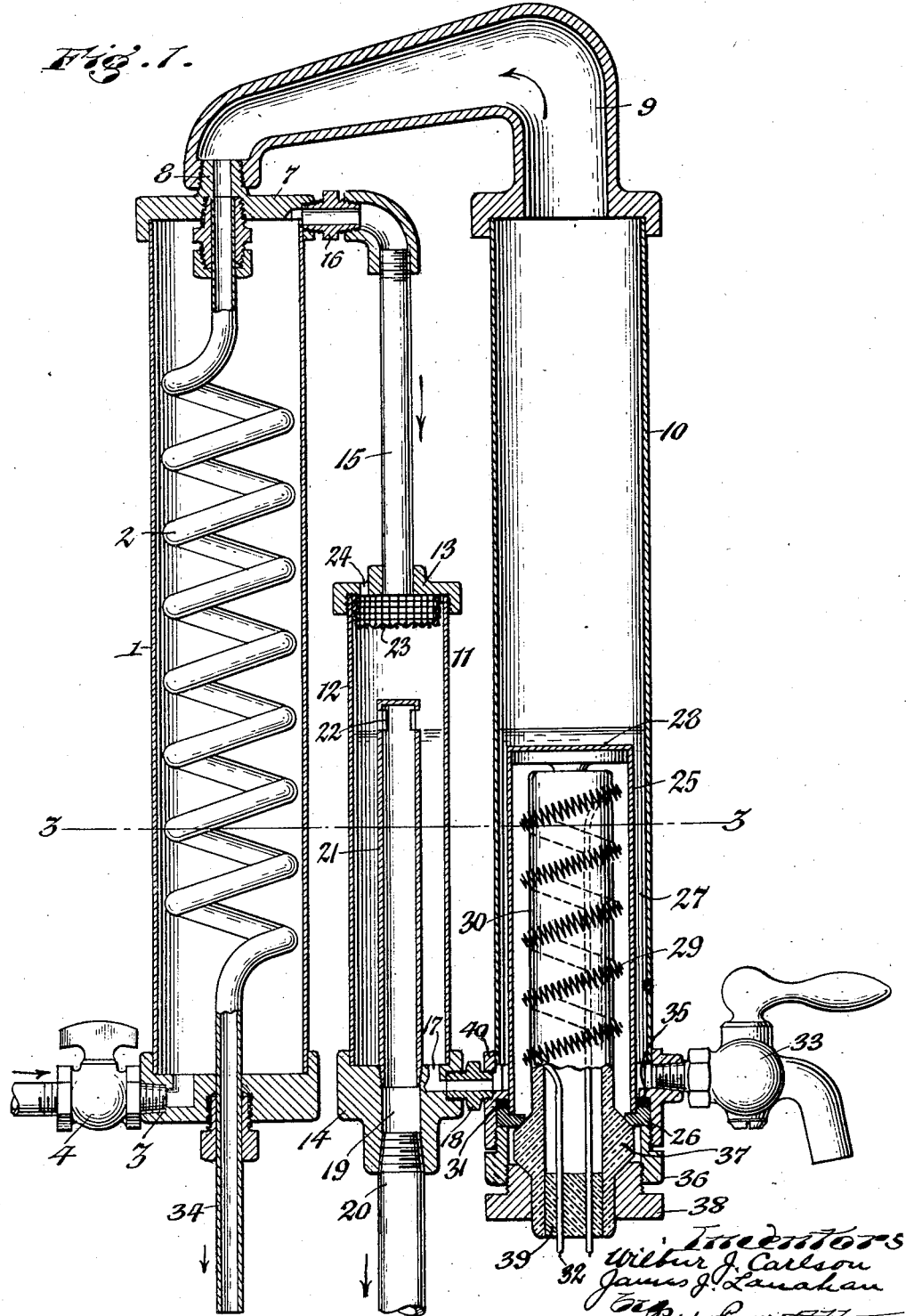

Patented July 5, 1927.

1,635,112

UNITED STATES PATENT OFFICE.

WILBUR J. CARLSON, OF ROCHESTER, AND JAMES J. LANAHAN, OF BUFFALO, NEW YORK.

HOUSEHOLD STILL.

Application filed June 29, 1925. Serial No. 40,207.

This invention relates to improvements in stills and proposes a structure which is particularly applicable for household use for the distillation of water supplied by the usual sink or basin tap.

The object of the invention is to provide a simply constructed and compactly organized still which may be readily mounted on a supporting bracket adjacent the tap from which the water is supplied, which will be efficient in the delivery of distilled water in quantities suitable for household needs, will not be liable to derangement and may be readily cleaned as an occasion may require.

The invention is illustrated in the accompanying drawing, wherein:—

Figure 1 is a vertical sectional view of the still.

Figure 2 is an elevation of the same as set up for use, and

Figure 3 is a cross section, taken on line 3—3 of Figure 1.

The raw water is admitted into an inlet chamber 1 which encloses a condensing coil 2. The chamber 1 is of upright tubular form and is provided at its lower end with a connection 3 which is preferably valved, as at 4, and is suitably coupled to a pipe or hose 5 which at its remote end (not shown) is detachably connected to the usual tap 6. The chamber 1 is closed at its upper end by a head 7 having a nipple 8 which is connected to a dome or elbow 9 fitted upon the upper end of a vaporizing chamber 10 which is also of upright tubular form. The vaporizing chamber 10 is supplied at its lower end with water from the inlet chamber 1, the connection being taken through a suitable water level regulator indicated generally at 11.

The water level regulator 11 includes an outer shell 12 having an upper head 13 and a lower head 14. The head 13 is connected to a tube or pipe 15 which in turn is connected to an outlet nipple 16 fitted at or near the upper end of the chamber 1, the nipple 16 being preferably fitted to the head 7. The head 14 is provided with a discharge passage 17 which communicates with a nipple 18 fitted to said head and to the chamber 10 near its lower end. The water from the inlet chamber 1 flows through the nipple 16 and tube 15 into the shell 12, whence it passes by the duct 17 and nipple 18 into a collar 40 at the lower end of the chamber 10.

The head 14 is also formed with a drainage opening 19 in which is fitted a drain pipe 20 projecting below the shell 12 and a water level regulating pipe 21 enclosed within the shell 12 and having suitable openings 22 at or near its upper end, the maximum water level in the vaporizing chamber being dependent on the elevation at which the openings 22 are arranged. In order to prevent the passage of any larger particles of matter into the chamber 10 a screen 23 is preferably fitted between the head 13 and the shell 12. The head 13 may also be formed with a small opening 24 which serves for the purpose of maintaining atmospheric pressure in the shell 12.

The vaporizing chamber 10 encloses a water heating shell 25 which is secured to the removable lower head 26 of the chamber 10 and extends to a point slightly below the maximum water level. The shell 25 and the surrounding portion of the cylindrical wall of the chamber 10 provide a narrow annular water heating space 27 with which the inlet connection 18 communicates. The shell 25 is closed at its lower end by the head 26 and at its upper end by a top plate 28 and encloses the heater structure which may be of any suitable kind, that shown consisting of a coil of nichrome wire 29 wound upon an upright insulating core 30.

The shell 25 is removably mounted in the vaporizing chamber 10 by engaging the upper side of the head 26 with a packing 31 supported on an internal shoulder 35 on the collar 40 and a clamping ring 36 having a screw connection with the collar and engaging with the lower end of the head 26. The insulating core 30 is removably mounted in the shell 25 by means of an external annular bead 37 on the lower part thereof engaging its upper side with the lower side of said head 26 and a clamping ring 38 bearing against the lower side of said bead 37 having a screw connection with said clamping ring 36, as shown in Figure 1. The terminal wires 32 of the heating element preferably extend through a plug 39 of insulating material in the lower end of the core. The chamber 10 is preferably provided at its lower end with a tap 33.

In use water is admitted through the connection 3 into the chamber 1 whence it flows by the pipe 16 and shell 12 into the heating chamber 10 and after the water has attained the maximum level in the chamber 10, as indicated by the overflow through the drain pipe 20, current is turned on to energize the coil 29. Thereby the water in the chamber 10 is vaporized and the steam escapes through the elbow 9 into the coil 2 and passes downward through said coil. In its passage through the coil 2 the steam is condensed by the water ascending through the chamber 1 so that distilled water is discharged at the external terminal 34 of the coil 2, the terminal 34 discharging into any suitable container. The steam which passes through the coil 2 and is condensed therein raises the heat of the water in the chamber 1 so that the water is fore-warmed before it reaches the vaporizing chamber 10 and the work of the heater is thus substantially facilitated. If for any reason a small supply of warm water should be needed the tap 33 is opened and the requisite amount, within the limits of the structure is withdrawn from the chamber 10 and shell 12.

The structure described is adapted for continuous operation subject to the proper regulation of the rate of the flow of water through the inlet connection 3. In practice it has been found that this rate should be that at which a continuous trickle of water flows from the drain pipe 20, as small an amount of water as will make a continuous stream being best. The wires 32 may be connected to the usual electric cord which may be fitted to a lamp socket, as shown in Figure 2, or to any other suitable electric connection. After the desired quantity of water has been distilled the operation of the device is discontinued by turning off the current and thereafter turning off the water.

The device may be readily cleaned by the simple expedient of opening the tap 33 and permitting the water to flow through the structure at its substantially full rate, the water escaping through the drain pipe 20 and through the tap 33. Whenever found desirable dirt and sediment may also be removed from the chamber 10 by removing the clamping ring 26 and withdrawing the shell 25 from the vaporizing chamber. If it be necessary to repair or renew the heating coil ready access to the same may be had by the removal of the heater structure from the shell 25, this being accomplished simply by unscrewing the ring 38 from the ring 36.

It will be noted that the structure takes up comparatively small space and hence may be readily supported above the sink or basin upon the adjacent wall from which the sink or basin is hung, the arrangement of the parts however being such that the inlet chamber is definitely separated from the vaporizing chamber so that it will not be directly subject to the vaporizing heat and hence the raw water will have its full efficiency for the condensation of the steam in the coil 2.

Having fully described our invention, we claim:—

1. In a household still, in combination, an upright tubular inlet chamber having an inlet connection for communication with a tap, an upright tubular vaporizing chamber, a relatively short elbow connected to the top of said vaporizing chamber and in open communication with the same and also connected to the top of said inlet chamber, a condensing coil located in said inlet chamber with one end connected to said elbow and the other end projecting externally, a pipe connected to said inlet chamber at its upper end and extending downward from its point of connection in the space between said chambers, an upright shell also located within the space, a nipple connecting the lower end of said shell and the lower end of said vaporizing chamber, said pipe being connected at its lower end to the top of said shell, an overflow pipe in said shell having a drainage connection through the bottom of said shell, and an electric heating element in the lower portion of said vaporizing chamber, said heating element providing an annular space in said vaporizing chamber and said nipple discharging into the lower end of said annular space.

2. In a household still, in combination, an upright vaporizing chamber comprising a cylindrical shell, a collar at the lower end of said shell, an inlet nipple fitted to said collar, a second shell enclosed within the first shell and providing an annular water space into which said nipple discharges, said collar having its lower portion internally threaded, a head enclosed within said collar and upon which said second shell rests at its lower end, an insulating core enclosed in said second shell, a heating element supported by said core, a clamping ring having threaded engagement in the lower part of said collar and engaging said head, said core having an annular bead engaging said clamping ring, and a second clamping ring engaging said bead and threaded into said first named clamping ring.

WILBUR G. CARLSON.
JAMES J. LANAHAM.